(12) United States Patent
Lin et al.

(10) Patent No.: US 8,565,743 B2
(45) Date of Patent: Oct. 22, 2013

(54) METHOD AND A PERVASIVE DEVICE OF AUTOMATICALLY DOWNLOADING A MIDLET TRIGGERED BY PUSH MESSAGES

(75) Inventors: Kay Lin, Taipei (TW); Rick M. F. Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1185 days.

(21) Appl. No.: 11/561,909

(22) Filed: Nov. 21, 2006

(65) Prior Publication Data

US 2007/0150550 A1 Jun. 28, 2007

(30) Foreign Application Priority Data

Dec. 26, 2005 (TW) .............................. 94146483 A

(51) Int. Cl.
*H04W 4/00* (2009.01)
*H04W 4/12* (2009.01)
*H04W 4/14* (2009.01)
*H04M 3/42* (2006.01)
*G06F 15/16* (2006.01)
*G06F 9/44* (2006.01)
*G06F 9/445* (2006.01)

(52) U.S. Cl.
USPC ........ 455/418; 455/466; 455/414.2; 709/217; 717/173; 717/174; 717/178; 717/118

(58) Field of Classification Search
USPC ................ 455/418, 412.1, 466, 414.1, 414.2; 717/114–118, 174–178; 709/217, 218
See application file for complete search history.

(56) References Cited

U.S. PATENT DOCUMENTS

| 6,216,157 | B1 |   | 4/2001  | Vishwanath et al. |
|-----------|----|---|---------|-------------------|
| 6,807,558 | B1 |   | 10/2004 | Hassett et al. |
| 7,079,839 | B1 | * | 7/2006  | Papineau ...................... 455/418 |
| 7,092,703 | B1 | * | 8/2006  | Papineau ...................... 455/418 |
| 7,437,149 | B1 | * | 10/2008 | Papineau et al. .............. 455/418 |
| 7,469,140 | B1 | * | 12/2008 | Papineau ...................... 455/418 |
| 7,471,947 | B1 | * | 12/2008 | Papineau ...................... 455/418 |
| 7,707,291 | B2 | * | 4/2010  | Davydov ...................... 709/227 |
| 8,311,518 | B2 | * | 11/2012 | Fiorini et al. .............. 455/414.1 |
| 8,356,351 | B2 | * | 1/2013  | Fu et al. ........................... 726/22 |
| 8,386,628 | B1 | * | 2/2013  | Hardebeck et al. ........... 709/231 |
| 2002/0073245 | A1 |   | 6/2002 | Hallford |
| 2003/0066059 | A1 |   | 4/2003 | Moon et al. |

(Continued)

FOREIGN PATENT DOCUMENTS

CN    200510008640    3/2005
CN         1645801    7/2005

(Continued)

OTHER PUBLICATIONS

JSR 118 Expert Group: "Mobile Information Device Profile for J2ME, version 2.0" Internet Citation; Nov. 5, 2002, pp. 1-75.*

(Continued)

*Primary Examiner* — Matthew Sams
(74) *Attorney, Agent, or Firm* — Brevetto Law Group

(57) ABSTRACT

A method and a pervasive device for service providers to actively trigger an automatic downloading and installing process of a midlet are provided. The invention is accomplished by receiving a push message comprising midlet downloading information; parsing said push message to get said midlet downloading information; and downloading the midlet according to said midlet downloading information.

24 Claims, 4 Drawing Sheets

1.
Choose a desired midlet (e.g. game) rom a webpage through a PC, makes note of the ID number of the midlet , and then places an order by making a call or sending a short message (SMS)。

2.
Receive a confirmation message, which is a WAP push message comprising an URL for downloading the midlet, from a server of service providers。

3.
Process the WAP push message by the WAP mobile device to retrieve the URL, and then depress View or Retrieve button to automatically Download & install the desired midlet (game)。

(56) References Cited

U.S. PATENT DOCUMENTS

| | | |
|---|---|---|
| 2003/0115348 A1 | 6/2003 | Ohashi |
| 2003/0224810 A1 | 12/2003 | Enzmann et al. |
| 2004/0110462 A1* | 6/2004 | Forstadius .................. 455/3.01 |
| 2004/0204010 A1 | 10/2004 | Tassberg et al. |
| 2005/0021801 A1 | 1/2005 | Kim |
| 2005/0071419 A1 | 3/2005 | Lewontin |
| 2006/0236325 A1* | 10/2006 | Rao et al. ...................... 719/315 |
| 2007/0073835 A1* | 3/2007 | Husa et al. .................... 709/217 |
| 2008/0159510 A1* | 7/2008 | Julien et al. ............. 379/202.01 |

FOREIGN PATENT DOCUMENTS

| | | |
|---|---|---|
| TW | 200412810 | 7/2004 |
| TW | 200522684 | 7/2005 |
| TW | I242353 | 10/2005 |
| WO | WO 2004114144 A1 * | 12/2004 |

OTHER PUBLICATIONS

Muchow J: "Implementing Push Technology with J2ME and MIDP" Internet Citation; Jun. 24, 2003, pp. 1-30.*

Ortiz, Enrique, "The MIDP 2.0 Push Registry", http://developers.sun.com/mobility/midp/articles/pushreg/, Jan. 2003, all pages.*

"The MIDP 2.0 Push Registry," http://developers.sun.com/techtopics/mobility/midp/articles/pushreg/ . "Jdeveloper Wireless Extension (JWE) User's Guide", pp. 1-78, Nov. 5, 2002.

* cited by examiner

1. Choose a desired midlet (e.g. game) from a webpage through a PC, makes note of the ID number of the midlet, and then places an order by making a call or sending a short message (SMS).

2. Receive a confirmation message, which is a WAP push message comprising an URL for downloading the midlet, from a server of service providers.

3. Process the WAP push message by the WAP mobile device to retrieve the URL, and then de-press View or Retrieve button to automatically Download & install the desired midlet (game).

Figure 2

METHOD AND A PERVASIVE DEVICE OF AUTOMATICALLY DOWNLOADING A MIDLET TRIGGERED BY PUSH MESSAGES

CROSS REFERENCE TO RELATED APPLICATIONS

This application claims priority to Taiwan Patent Application No. 94146483 entitled "A METHOD AND A PERVASIVE DEVICE OF AUTOMATICALLY DOWNLOADING A MIDLET TRIGGERED BY PUSH MESSAGES", filed on Dec. 26, 2005, which is incorporated herein by reference and assigned to the assignee herein.

FIELD OF INVENTION

The present invention generally relates to a technique of automatic downloading & installing a midlet, and more particularly, to actively trigger an automatic downloading and installing process of a midlet by service providers.

BACKGROUND OF THE INVENTION

Java is an object oriented programming language developed by Sun Microsystems in the United States. Java language comes in many forms including: Standard Edition (J2SE), Java 2 Enterprise Edition (J2EE), and Java 2 Micro Edition (J2ME). Among them, J2ME refers to a Java platform suitable for a limited system environment including a mobile communication environment.

As shown in FIG. 1, a Java program is run on the J2ME/CLDC/MIDP 300 platform. The J2ME may be implemented using a connected limited device configuration (CLDC) which handles a core portion related to execution of a midlet 400, a Java program, and a mobile information device profile (MIDP) constituting the runtime environment of the midlet. A midlet is a Java program that is written for MIDP standard. Currently, the 2.0 version of MIDP is in distribution. This version includes a push registry 100, which performs the functions of registering the midlet and automatically operating the midlet 400 upon receiving a corresponding request from an external source.

In J2ME platform, an application management software 200 (AMS) is a software component for application delivery and management, responsible for installing, launching, upgrading, controlling version, and managing life-cycle of all midlets running on J2ME platform and the like.

Conventional Java programs, or midlets in J2ME terminology, are usually downloaded over the air (OTA) from service providers or other sources. Currently, a mobile user has to connect to a network, manually type an Uniform Resource Location (URL) to connect to a web page, browse lists of midlets, and select/install the one to be downloaded. The whole midlet downloading and retrieving process is initiated from client, and the select & download & install mechanism are manually done by the user. The step of manually typing a URL is tedious for a mobile user, thus it is not user-friendly.

Alternatively, as shown in FIG. 2, at step 1, a user chooses a desired midlet (e.g. game) from a webpage through a PC, makes note of the ID number of the midlet, and then places an order by making a call or sending a short message (SMS). The user will receive a confirmation message from a server of service providers. The confirmation message is a WAP push message comprising an Uniform Resource Location (URL) for downloading the midlet. The WAP push message is sent to a WAP mobile device of the user by a WAP push (Step 2). The WAP push message is processed by the WAP mobile device to retrieve the URL, and then the desired midlet is automatically downloaded and installed by depressing a View or Retrieve button (Step 3).

The conventional techniques mentioned above either request a user operates manually on a mobile device or request the user to make a call or send a SMS. All of them are not user-friendly. Moreover, according to the conventional techniques mentioned above, services providers do not have the initiative to push midlets to client devices. Accordingly, service providers cannot promote some new midlets (e.g. game) or approach consumers actively. Service providers cannot provide services of automatic midlet distribution to mobile devices or midlet subscription to periodically distribute new midlets to client devices of subscribers.

According to the conventional technique as shown in FIG. 2, a WAP push only involves in triggering a downloading process. After downloading a desired midlet, installing process, the user still needs to initiate an installing process. The downloading process of a midlet triggered by a WAP push message is the same as MMS (Multi-media Messaging Service) downloading process. Therefore, a WAP push message will be confused with a MMS notification. Besides, it is also disadvantageous for the WAP push to require a WAP-enabled mobile device.

Thus, there is a need to provide a method, a device and a system to allow a downloading process of a midlet to be actively triggered by a user or a service provider, and then the midlet will be automatically downloaded, installed and managed by a standard AMS. Subscribers of some downloadable services no longer have to bother finding links and downloading manually. Accordingly, it will create lots of opportunities for service providers to promote Java services and advertisement to a mobile user.

SUMMARY OF THE INVENTION

A method and a pervasive device for service providers to actively trigger an automatic downloading and installing process of a midlet are provided. Accordingly, the present invention enable a user to trigger a automatic downloading and installing process of a midlet from a PC, or enable a service provider to initiate a midlet push to mobile devices, any wireless pervasive devices or any information applicances (IA) which can receive a push message to actively trigger the automatic downloading and installing process of the midlet.

The present invention is accomplished by receiving a push message comprising midlet downloading information; parsing said push message to get said midlet downloading information; and downloading said midlet according to said midlet downloading information. This kind of technique to enable a service provider to trigger an automatic downloading and installing process of a midlet by a push message is called herein as a "midlet push".

BRIEF DESCRIPTION OF THE DRAWINGS

In order to further understand of the invention and advantages thereof, the following detailed description of the disclosed embodiment will be considered in conjunction with the accompanying drawings, in which:

FIG. 2 illustrates a flow chart of the conventional technique to trigger a downloading process manually done by a user;

DETAILED DESCRIPTION OF THE INVENTION

Figure 1:
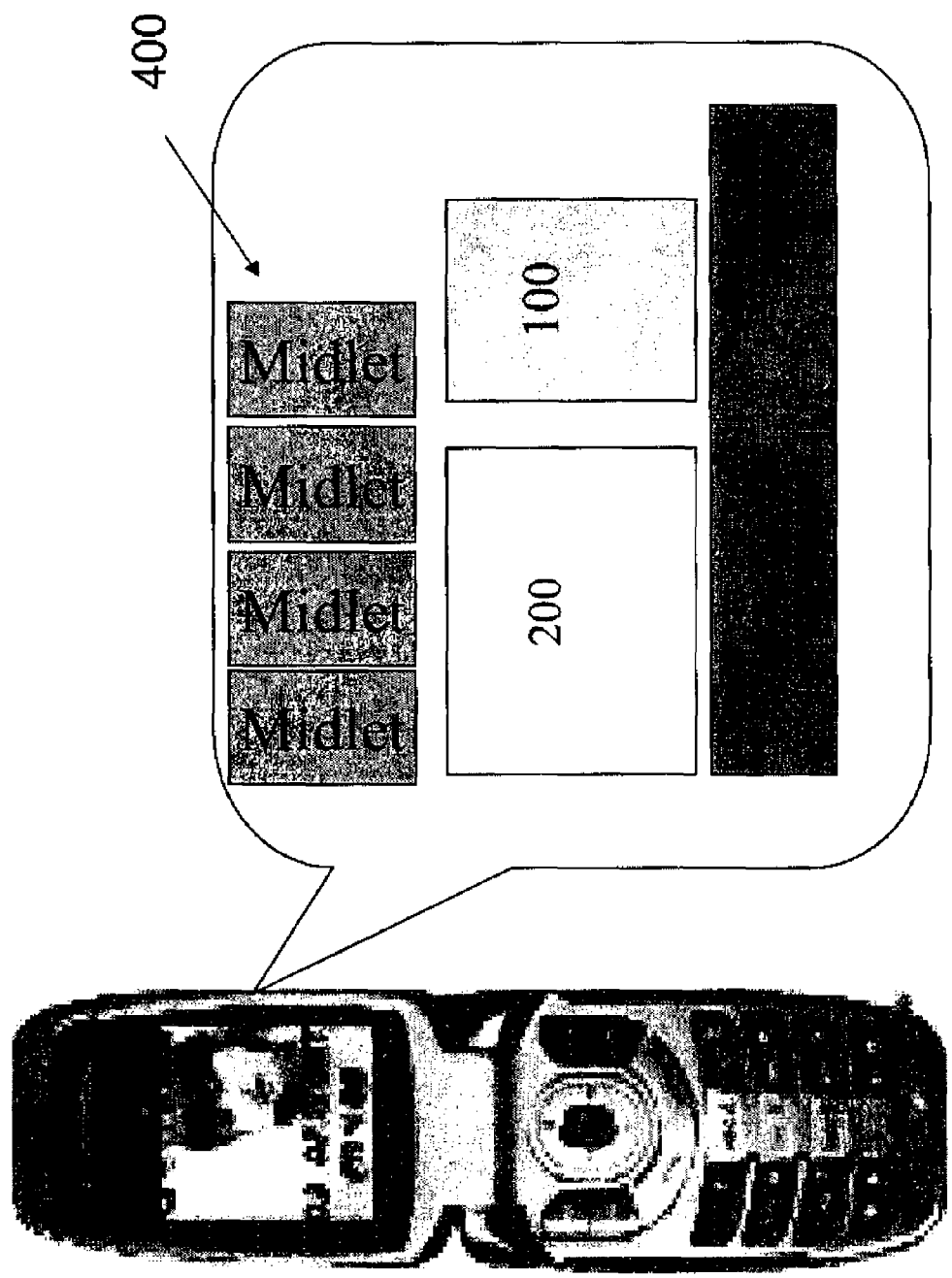
FIG. 1 illustrates the system environment of the conventional mobile device.

Terminology
1. J2ME (Java 2, Micro Edition): J2ME is one of three JAVA 2 platforms (J2EE, J2SE & J2ME) developed by Sun Microsystems in the United States. J2ME is an application environment that specifically addresses the needs of embedded systems or handheld systems including mobile phones, pagers, PDAs, set-top boxes and other consumer appliances. J2ME is further divided into configurations, profiles and option packages for hardware features of different devices. Configurations are specifications that define a basic core set of class libraries available for a range of devices. A Configuration mainly classifies consumer electrical products according to features of network connectivity, processor speed and memory capacity and the like. Currently, there are two J2ME configurations well defined: CDC (Connected Device Configuration) and CLDC (Connected Limited Device Configuration).

J2ME makes a more detailed classification for features of different devices utilizing a profile which defines another set of additional class on a Configuration specification.

J2ME defines MIDP (Mobile Information Device Profile) which defines a class suitable for mobile devices. More detailed information can be found in websites of Sun Microsystems as follows:

http://java.sun.com/j2me/
http://java.sun.com/products/midp
http://java.sun.com/products/cldc 2. MIDP (Mobile Information Device Profile): a profile of J2ME for mobile devices, such as cell phones.
3. Midlet (Java program that is written for MIDP standard.): Applications written for MIDP are called a Midlet.
4. AMS (Application Manager Software): basic components of Java run-time environment in MIDP 2.0 specification, responsible for downloading, installing, launching upgrading controlling version and managing life cycles (install, activate execute and remove) of all midlets running on J2ME platform.
5. Push Message: a message initiated by a server side and delivered to client side compulsively.
6. Push Registry: a new mechanism introduced in MIDP 2.0. The Push Registry is the component of the AMS in MIDP 2.0, responsible for registration and dispatch incoming push message. As soon as a registered event occurs, the push registry allows AMS to enable midlets to be launched automatically, without user initiation.

For example, the port 2984 is set to initiate midlet 1; the port 8008 is set to initiate midlet 2. The detailed description can be found with reference to SUN website as follows:

http://developers.sun.com/techtopics/mobility/
http://midp/articles/pushreg/index.html 7. WAP (Wireless Application Protocol) push: WAP push message is a SMS with a URL. A WAP push is involved in sending a SMS with a URL from Website to WAP-enabled mobile devices.

The following will describe the embodiment of the present invention. The disclosed embodiment is only for illustration, thus it will be understood by those skilled in the art that there are many modifications and changes made therein without departing from the spirit and scope of the invention. Throughout the appended drawings, like features are identified by like reference numerals.

Figure 3:
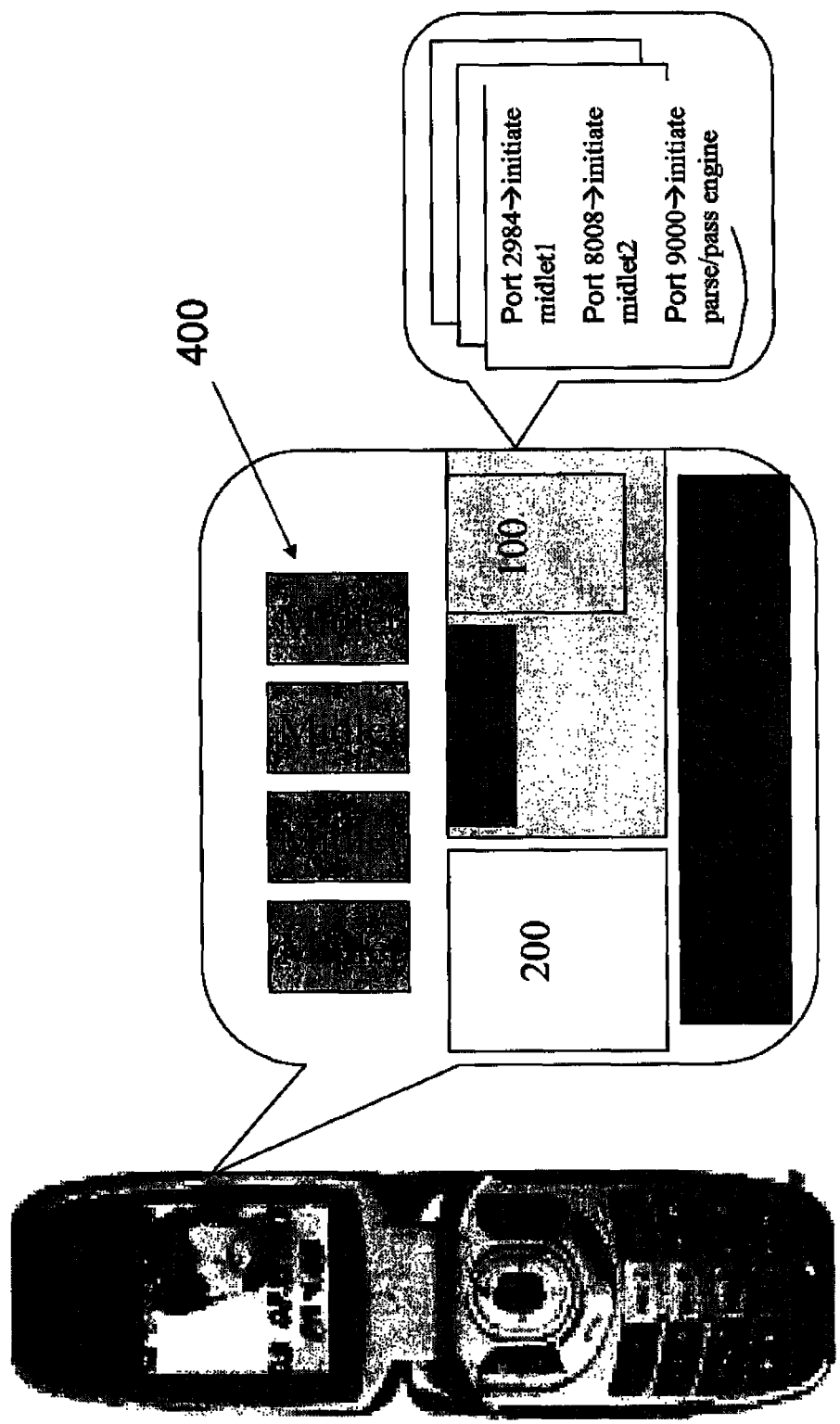
FIG. 3 illustrates the system embodiment of the mobile device according to the present invention.

First, please refer to FIG. 3, which illustrates the system embodiment of the mobile device according to the present invention. The push registry 100 will add a new registry in order to launch a new component, i.e. a parse/pass engine 500. For example, the port 9000 is set for the added new registry to initiate the parse/pass engine 500. When a system server 10 (also called as a service provider) intends to push a midlet to client devices of subscribers, it sends out a push message comprising midlet downloading information. The push registry within subscribers' devices will initiate the parse/pass engine 500 based on the port value 9000. The push, for example, may be a SMS/WAP push, a Data gram push or a SIP (Session Initiation Protocol) push. The parse/pass engine 500 will parse the push message comprising midlet downloading information (e.g. URL) to retrieve the midlet downloading information, and then pass it to AMS 200 (Application Manager Software) and initiate AMS 200 to proceed the downloading and installing process of the midlet.

Figure 4:
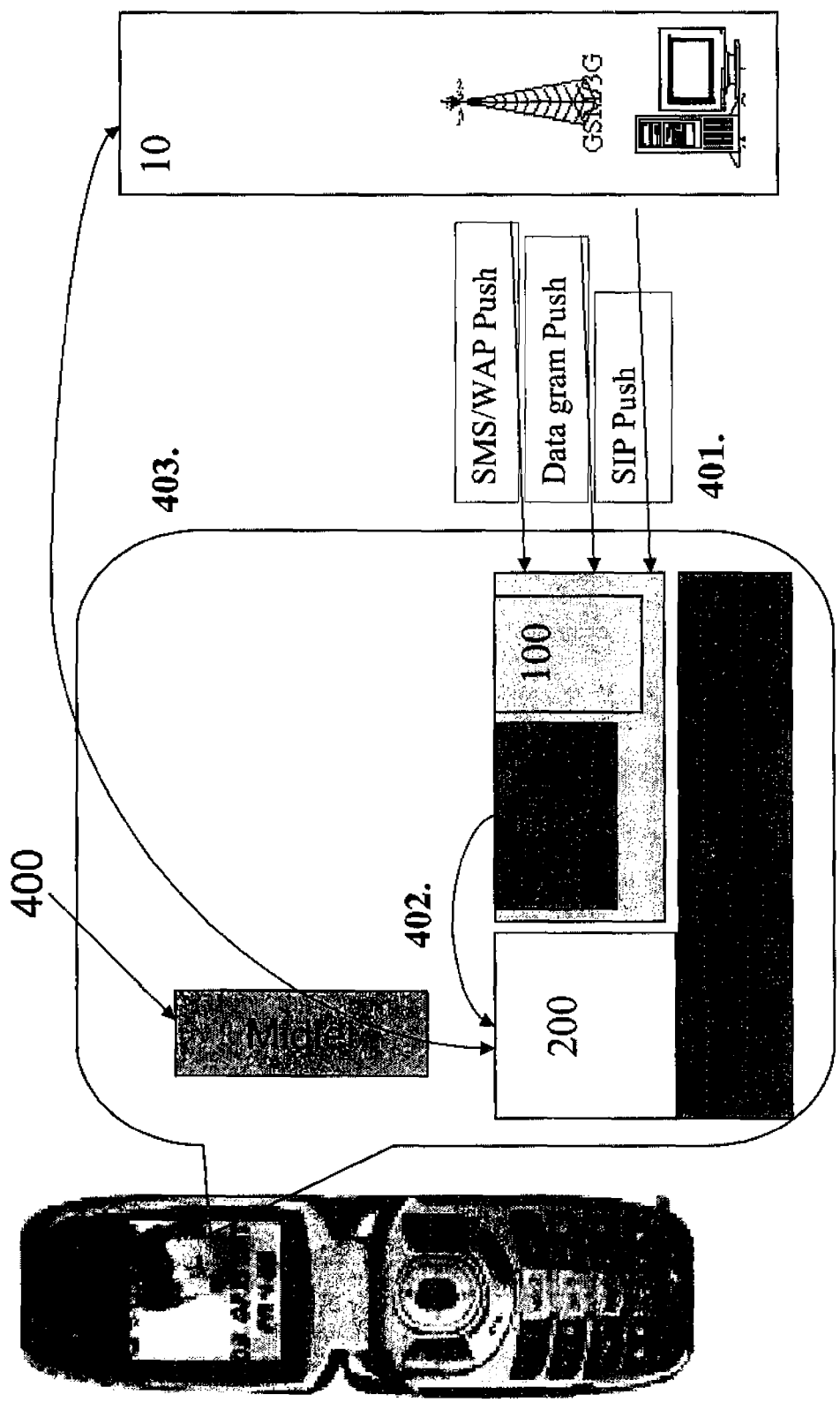
FIG. 4 illustrates a flow chart of automatically downloading & installing process of a midlet to be actively triggered by a service provider, according to a preferred the present invention

FIG. 4 illustrates a flow chart of automatically downloading & installing process of a midlet to be actively triggered by a service provider, according to a preferred the present invention. First of all, the service provider 10 sends out the push message to subcribers' devices. The message comprises midlet downloading information of the desired midlet (e.g. URL) and a port value (e.g. port value=9000). The push registry within subscribers' devices will initiate a parse/pass engine 500 based on the port value 9000 (step 401).

The parse/pass engine 500 parses the received push message to retrieve the midlet downloading information. The downloading information is the URL of a website for downloading the desired midlet. Then, the parse/pass engine 500 passes the URL to AMS 200 and initiates AMS 200 (step 402). The AMS 200 will be responsible for downloading the desired midlet from the website represented by the URL and automatically installing the midlet (step 403).

Basically, the parse/pass engine 500 may be a midlet initiated by the push registry 100. It can only function to parse the push message to retrieve the downloading information, and pass the downloading information to AMS 200 and initiate downloading and installing function of AMS 200. These functions are basically easily accomplished by those skilled in the art. Actually, the implementation may incorporate the downloading and installing function into the parse/pass engine 500. The present invention can apply to any portable, miniaturized computing devices, such as PDA, smart mobile phone or any similar wireless pervasive devices. The invention can also apply to any information applicances which can receive a push message without limitation to WAP mobile device.

A service provider can promote some new midlets (e.g. game) or approach consumers actively by actively triggering a "midlet push". Accordingly, it will create lots of opportunities for service providers to promote Java services and advertisement to a mobile user. In addition, service providers also provide user with a service to periodically subscribe new midlets therefrom while there is no need to manually find out a link of downloading, and manually download and install as done by the conventional arts.

The illustration of the embodiment of the present invention is given above for a better understanding of the characteristics and spirit of the present invention. It will be understood that the invention is not limited to the particular embodiment described herein, but is capable of various modifications and rearrangements without departing from the scope of the invention. Therefore, it is intended that the following claims, accompanied by detailed descriptions given the broadest explanation, not only define the scope of the present invention but also cover all such modifications and changes as fall within the true spirit and scope of the present invention.

What is claimed is:

1. A method of automatically downloading and installing a midlet, comprising steps of:
    registering a parse/pass engine configured to parse a push message;
    receiving said push message comprising midlet downloading information including a URL and a port value;
    launching the parse/pass engine in response to said port value;
    parsing said push message by said parse/pass engine to get said midlet downloading information including the URL;
    said parse/pass engine launching application management software (AMS) in response to retrieving the URL, and said parse/pass engine passing the URL to the application management software (AMS) for downloading and installing the midlet;
    downloading said midlet from the URL according to said midlet downloading information; and
    installing the downloaded midlet, the installing being performed as a result of said port value being received in the midlet downloading information.

2. The method of claim 1, wherein the steps of parsing said push message, downloading said midlet, and installing the downloaded midlet are performed without manual intervention by a user in response to receiving the push message including said port value.

3. The method of claim 1, wherein said registering step is registered by a push register table.

4. The method of claim 1, wherein said push message is a SMS or WAP push.

5. The method of claim 1, wherein said midlet is a Java program that is written for MIDP standard.

6. The method of claim 1, wherein said parse/pass engine is pre-registered with the port value.

7. The method of claim 1, wherein the registering of said parse/pass engine comprises registering the parse/pass engine in a registry included as a component of the AMS, and said parse/pass engine is a Java program conforming to the Mobile Information Device Profile (MIDP) standard.

8. A pervasive device configured to automatically download and install a midlet, comprising:
    registering means for registering a parse/pass engine configured to parse a push message;
    receiving means for receiving said push message comprising midlet downloading information including a URL and a port value;
    initiating means for initiating the parse/pass engine in response to said port value;
    parsing means for parsing said push message by said parse/pass engine to get said midlet downloading information including said URL;
    downloading means for downloading said midlet from the URL according to said midlet downloading information; and
    installing means for installing said downloaded midlet, said installing means being configured to perform the installing in response to said port value being received in the midlet downloading information;
    wherein said parse/pass engine initiates application management software (AMS) in response to retrieving the URL and passes the URL to the application management software (AMS) for downloading and installing the midlet.

9. The pervasive device of claim 8, wherein parsing said push message, downloading said midlet, and installing said downloaded midlet are performed without manual intervention by a user in response to receiving the push message including said port value.

10. The pervasive device of claim 8, wherein said registering means is a push register table.

11. The pervasive device of claim 8, wherein said push message is a SMS or WAP push.

12. The pervasive device of claim 8, wherein said midlet is a Java program that is written for MIDP standard.

13. The pervasive device of claim 8, wherein said pervasive device is a mobile device or a PDA.

14. The pervasive device of claim 8, wherein said parse/pass engine is pre-registered with the port value.

15. The pervasive device of claim 8, wherein the AMS comprises a registry component in which said parse/pass engine is registered, and said parse/pass engine is a Java program conforming to the Mobile Information Device Profile (MIDP) standard.

16. A system of actively triggering an automatic downloading and installation process of a midlet, comprising:
    a server sending a push message to a pervasive device, said push message comprising midlet downloading information including a URL and including a port value configured to launch a parse/pass engine in response to said port value;
    receiving means for receiving a download request at the URL from the pervasive device configured to parse said push message to get said midlet downloading information after said pervasive device receives said push message
    installing means for installing said downloaded midlet, said installing means being configured to perform the installing response to said port value being received in the midlet downloading information; and
    downloading means for downloading a midlet according to said midlet downloading information;
    wherein said parse/pass engine further being configured to launch application management software (AMS) in response to retrieving the URL, and to pass the URL to the application management software (AMS) for downloading and installing the midlet.

17. The system of claim 16, wherein said installing means is configured to install said downloaded midlet without manual intervention by a user in response to receiving the push message including said port value.

18. The system of claim 16, wherein the AMS comprises a registry component in which said parse/pass engine is registered, and said parse/pass engine is a Java program conforming to the Mobile Information Device Profile (MIDP) standard.

19. A method of downloading a midlet from a service provider to a mobile device, said midlet to be installed on the mobile device in response to a push message from the service provider, the method comprising:

providing a parse/pass engine to the mobile device parse the push message to obtain midlet downloading information including a URL and a port value, wherein said parse/pass engine is configured to parse the push message to determine the URL in response to receiving the push message with the port value;

sending the push message from the service provider to the mobile device, said push message comprising said port value and the midlet downloading information including the URL; and downloading the midlet from the URL to the mobile device upon receiving a request at the URL from the mobile device in accordance with said midlet downloading information obtained by the mobile device from the push message;

wherein said parse/pass engine, in response to determining the URL, is configured to launch application management software (AMS) to download and install said midlet in response to the push message containing said port value being received, the installing being performed as a result of said port value being received in the midlet downloading information.

20. The method of claim 19, wherein the downloading of the midlet and the installing of the downloaded midlet are performed without manual intervention by a user in response to receiving the push message including said port value.

21. The method of claim 19, wherein said parse/pass engine is registered by a push register table of the mobile device.

22. The method of claim 19, wherein said push message is a SMS or WAP push.

23. The method of claim 19, wherein said midlet is a Java program that is written for MIDP standard.

24. The method of claim 19, wherein the parse/pass engine is registered in a registry included as a component of the AMS, and said parse/pass engine is a Java program conforming to the Mobile Information Device Profile (MIDP) standard.

* * * * *